(12) United States Patent
Seider

(10) Patent No.: US 10,482,902 B2
(45) Date of Patent: Nov. 19, 2019

(54) METHOD AND SYSTEM TO EVALUATE AND QUANTIFY USER-EXPERIENCE (UX) FEEDBACK

(71) Applicant: Martin Benjamin Seider, Fort Mill, SC (US)

(72) Inventor: Martin Benjamin Seider, Fort Mill, SC (US)

(73) Assignee: Martin Benjamin Seider, Fort Mill, SC (US)

( * ) Notice: Subject to any disclaimer, the term of this patent is extended or adjusted under 35 U.S.C. 154(b) by 45 days.

(21) Appl. No.: 15/942,782

(22) Filed: Apr. 2, 2018

(65) Prior Publication Data

US 2018/0286428 A1    Oct. 4, 2018

Related U.S. Application Data

(60) Provisional application No. 62/480,343, filed on Mar. 31, 2017.

(51) Int. Cl.
| | |
|---|---|
| *G10L 25/60* | (2013.01) |
| *G10L 25/30* | (2013.01) |
| *G06F 3/16* | (2006.01) |
| *G06F 3/048* | (2013.01) |
| *G10L 25/48* | (2013.01) |
| *G06N 3/08* | (2006.01) |
| *G06N 3/04* | (2006.01) |
| *G10L 25/18* | (2013.01) |

(52) U.S. Cl.
CPC .............. *G10L 25/60* (2013.01); *G06F 3/048* (2013.01); *G06F 3/16* (2013.01); *G10L 25/30* (2013.01); *G10L 25/48* (2013.01); *G06N 3/0454* (2013.01); *G06N 3/08* (2013.01); *G10L 25/18* (2013.01)

(58) Field of Classification Search
CPC ......... G10L 25/60; G10L 25/30; G10L 25/48; G06F 3/048; G06F 3/16
See application file for complete search history.

(56) References Cited

U.S. PATENT DOCUMENTS

| | | | |
|---|---|---|---|
| 10,223,934 B2 * | 3/2019 | Paul .................... | A61B 5/7264 |
| 2002/0072952 A1 * | 6/2002 | Hamzy .................. | G06Q 30/02 |
| | | | 705/7.29 |
| 2009/0259956 A1 * | 10/2009 | Barsook ............. | H04N 5/44513 |
| | | | 715/764 |

(Continued)

*Primary Examiner* — Mohammad K Islam
(74) *Attorney, Agent, or Firm* — Meunier Carlin & Curfman LLC

(57) ABSTRACT

The exemplified methods and systems facilitate the evaluation of user experience feedback in a manner that is secure and private by transmitting only representation of a user's response over the network (rather than the original data files of the recording). That is, complex interaction associated with a user to a stimuli is recorded, evaluated, and condensed through a machine learning operation (specifically, a convolutional neural network) performed at the user's computing device. Indeed, only a representation of the interaction is exposed over the network when it is transmitted for subsequent action there-at. Specific audio or image recording used to evaluate the user's user-experience feedback is maintained at the user's computing device. In some embodiments, the recording is preprocessed to generate a series of matrices that can be directly fed into the machine learning operation.

20 Claims, 8 Drawing Sheets

(56) References Cited

U.S. PATENT DOCUMENTS

| | | | |
|---|---|---|---|
| 2014/0351133 A1* | 11/2014 | Christian | G06Q 20/40 |
| | | | 705/44 |
| 2015/0170228 A1* | 6/2015 | Wheeler | G06Q 30/0282 |
| | | | 705/319 |
| 2017/0154293 A1* | 6/2017 | Baduge | G10L 15/10 |
| 2019/0043069 A1* | 2/2019 | Lee | G16H 50/20 |

* cited by examiner

Ringtone DB — 402

| ID | Title | Description | Category | Audio Uri | Image Uri | Model Uri | Reward | Target groups | Target location |
|---|---|---|---|---|---|---|---|---|---|
| ... | 404 | 406 | 408 | 410 | 412 | 414 | 416 | 418 | 420 | 422 |

*FIG. 4*

User DB — 326

| Username | Provider auth. | Location | Demographics | Targetable profile | Balance | Encrypt key | Selected ringtone |
|---|---|---|---|---|---|---|---|
| ... | 424 | 426 | 428 | 430 | 432 | 434 | 436 | 437 |

*FIG. 5*

Response DB — 328

| Username | Date & time | Location | Response Uri | Ringtone ID | mood | energy | company | Reward |
|---|---|---|---|---|---|---|---|---|
| ... | 438 | 440 | 442 | 444 | 446 | 448 | 450 | 452 | 454 |

*FIG. 6*

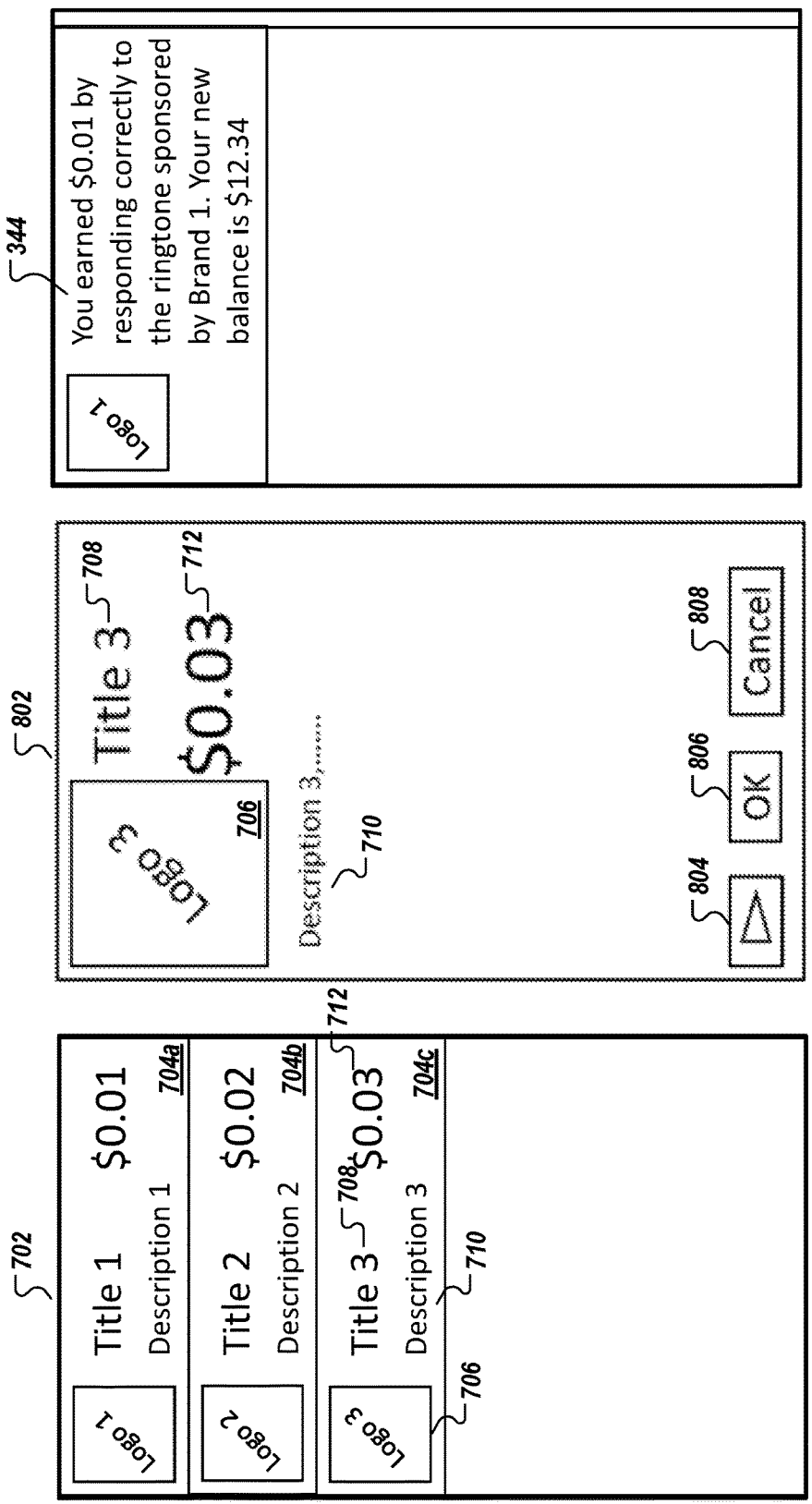

METHOD AND SYSTEM TO EVALUATE AND QUANTIFY USER-EXPERIENCE (UX) FEEDBACK

RELATED APPLICATION

This application claims priority to, and the benefit of, U.S. Provisional Appl. No. 62/480,343, filed Mar. 31, 2017, entitled "Application to capture, evaluate and reward client reaction to themes played on a device," which is incorporated by reference herein in its entirety.

TECHNICAL FIELD

The present disclosure generally relates to methods and systems for evaluating and quantifying user-experience (UX) feedback in response to a user-interface presentation.

SUMMARY

The exemplified methods and systems facilitate the evaluation of user experience feedback in a manner that is secure and private by transmitting only representation of a user's response over the network (rather than the original data files of the recording). That is, complex interaction associated with a user to a stimuli is recorded, evaluated, and condensed through a machine learning operation (specifically, a convolutional neural network) performed at the user's computing device. Indeed, only a representation of the interaction is exposed over the network when it is transmitted for subsequent action there-at. Specific audio or image recording used to evaluate the user's user-experience feedback is maintained at the user's computing device. In some embodiments, the recording is preprocessed to generate a series of matrices that can be directly fed into the machine learning operation.

In some embodiments, the exemplified methods and systems facilitate capture and evaluation of a reaction of a user to a theme played on a device for the purpose of generating a reward to the user so as to engage the user with sponsored content.

In an aspect, a computer-implemented method is disclosed to evaluate and quantify user-experience (UX) feedback in response to a user-interface presentation (e.g., a themed ringtone). The method includes generating, by a processor of a computing device (e.g., smartphone, wearable devices, smartwatches, smart glasses, laptops, desktops), via one or more speakers of, or connected to, the computing device, a multimedia output of a plurality of selectable multimedia outputs accessible from the computing device, wherein the multimedia output comprises an audio output (e.g., a ringtone) associated with a stored audio file, and wherein the multimedia output is generated upon receipt of an electronic communication or notification (e.g., a SMS message, electronic mail) at the computing device; recording, by the processor, via one or more microphones of, or connected to, the computing device, an audio stream as part of a user-experience (UX) feedback to the user-interface presentation, wherein the audio stream is recorded immediately following, and/or during, the audio output being generated, and wherein the audio stream is recorded as an audio file or as a cached data; determining, by the processor, a spectrum profile of each, or a substantial portion, of a plurality of audio segments of the recorded audio file or the cached data; and, determining, by the processor, a matrix comprising the plurality of spectrum profiles for each of the plurality of audio segments and providing the matrix to a machine learning operation configured to analyze the user-experience (UX) feedback, wherein the matrix is used as an input for the machine learning artifact configured with weights specific to the multimedia output to evaluate and quantify a user-experience (UX) feedback of the multimedia output.

In some embodiments, the machine learning artifact comprises a convolutional neural network, and wherein the inputted matrix is arranged as a one-dimensional vector, a two-dimensional matrix (e.g., a two-dimensional greyscale image), or a three-dimensional matrix.

In some embodiments, the matrix is determined by: segmenting, by the processor, the recorded audio file or the cached into a plurality of segments; normalizing, by the processor, the plurality of segments; determining, by the processor, intensity of the frequencies bands of the plurality of segments by performing a Fast Fourier Transform of the plurality of segments; and, generating, by the processor, the two-dimensional matrix, wherein the two-dimensional matrix is of dimension m*n, wherein m is a number of segments of the plurality of segments and n is a number of frequency bands of the plurality of frequency bands, and each matrix element has a one or more scalar values (or a zero), e.g., corresponding to an intensity of a given frequency band for a given segment.

In some embodiments, the method further includes acquiring, by the processor, via one or more accelerometers of the computing device, one or more detected accelerometer signals during and/or immediately following the audio output as an accelerometer file or as cached data, wherein the one or more detected accelerometer signals comprise an additional part of the user-experience (UX) feedback of the user-interface presentation; and, determining, by the processor, a second matrix comprising the plurality of accelerometer signals and providing the second matrix as an input to the machine learning artifact. In some embodiments, the accelerator file includes accelerometer signals acquired for each axis of acceleration. In some embodiments, each accelerator signal is provided as an input per-axis to the machine learning operation as an m*1 vector, which corresponds to a number of time segments. In other embodiments, each of the accelerometer signals is decomposed to assess specific intensities of certain frequencies in the acceleration. In some embodiments, the accelerator input is combined with the input matrix associated with the audio file or audio stream.

In some embodiments, the plurality of selectable multimedia outputs further comprises a visualization element (e.g., ringtone includes associated ringtone graphics), wherein the visualization element is rendered and presented on a display of the computing device contemporaneously with the audio output.

In some embodiments, the plurality of selectable multimedia outputs further comprises a haptics element (e.g., ringtone includes associated vibration pattern), wherein the haptics element triggers rotation of a motor of the computing device to produce vibration of the computing device contemporaneously with the audio output.

In some embodiments, the computing device is selected from the group consisting of smartphone, wearable devices, smartwatches, smart glasses, laptops, and desktops.

In some embodiments, the method further includes output of the machine learning artifact is used to assess the user-experience feedback to the user-interface presentation based on rules specific to the user-interface presentation.

In some embodiments, the rules to assess the user-experience feedback is based on training data gathered from user-experience feedback to the specific user-interface presentation.

In some embodiments, the method further includes transmitting, by the processor, over a network, output of the machine learning operation to an external UX analysis service, wherein the output of the machine learning operation is used by the UX analysis service to trigger a reward to an account associated with the user.

In some embodiments, the method further includes encrypting, by the processor, output of the machine learning artifact prior to transmission of the output to the external UX analysis service.

In another aspect, a system is disclosed comprising a processor; and a memory having instructions stored thereon, wherein execution of the instructions by the processor, cause the processor to: generate, via one or more speakers of, or connected to, the system, a multimedia output of a plurality of selectable multimedia outputs accessible to the system, wherein the multimedia output comprises an audio output (e.g., a ringtone) associated with a stored audio file, and wherein the multimedia output is generated upon receipt of an electronic communication or notification (e.g., a SMS message, electronic mail) at the system; record, via one or more microphones of, or connected to, the computing device, an audio stream as part of a user-experience (UX) feedback of the user-interface presentation, wherein the audio stream is recorded immediately following, and/or during, the audio output being generated, and wherein the audio stream is recorded as an audio file or as a cached data; determine, a spectrum profile of each, or a substantial portion, of a plurality of audio segments of the recorded audio file or the cached data; and, determine a matrix comprising the plurality of spectrum profiles for each of the plurality of audio segments and provide the matrix to a machine learning artifact configured to analyze the user-experience (UX) feedback, wherein the matrix is used as an input for the machine learning artifact configured with weights specific to the multimedia output to evaluate and quantify user-experience (UX) feedback.

In some embodiments, the machine learning artifact comprises a convolutional neural network, and wherein the inputted matrix is arranged as a two-dimensional matrix.

In some embodiments, the instructions, when executed by the processor, further cause the processor to: segment the recorded audio file or the cached data into a plurality of segments; normalize the plurality of segments; determine intensity of the frequencies bands of the plurality of segments by performing a Fast Fourier Transform of the plurality of segments; and, generate the two-dimensional matrix, wherein the two-dimensional matrix is of dimension m*n, wherein m is a number of segments of the plurality of segments and n is a number of frequency bands of the plurality of frequency bands, and each matrix element has one or more scalar values (or zero) corresponding to an intensity of a given frequency band for a given segment.

In some embodiments, the instructions, when executed by the processor, further cause the processor to: encrypt the output of the machine learning artifact; and, transmit, over a network, the output of the machine learning artifact to an external UX analysis service, wherein the output of the machine learning artifact is used by the UX analysis service to trigger a reward to an account associated with the user.

In some embodiments, the instructions when executed by the processor, further cause the processor to: acquire, via one or more accelerometers of the system, one or more detected accelerometer signals immediately following and/or during the audio output as an accelerometer file or as cached data, wherein the one or more detected accelerometer signals comprise an additional part of the user-experience (UX) feedback of the user-interface presentation; and, determine a second matrix comprising the plurality of accelerometer signals and provide the second matrix to the UX analysis computing device, wherein the second matrix is used as a second input to the machine learning artifacts.

In another aspect, a non-transitory computer readable medium is disclosed. The computer readable medium has instructions stored thereon, wherein execution of the instructions by a processor of a computing device causes the processor to: generate, via one or more speakers of, or connected to, the computing device, a multimedia output of a plurality of selectable multimedia outputs accessible to the computing device, wherein the multimedia output comprises an audio output (e.g., a ringtone) associated with a stored audio file, and wherein the multimedia output is generated upon receipt of an electronic communication or notification (e.g., a SMS message, electronic mail) at the computing device; record, via one or more microphones of, or connected to, the computing device, an audio stream immediately following, and/or during, the audio output as part of a user-experience (UX) feedback of the user-interface presentation, wherein the audio stream is recorded as an audio file or as cached data; determine, a spectrum profile of each, or a substantial portion, of a plurality of audio segments of the recorded audio file or the cached data; and, determine a matrix comprising the plurality of spectrum profiles for each of the plurality of audio segments and provide the matrix to a machine learning artifact configured to analyze the user-experience (UX) feedback, wherein the matrix is used as an input for the machine learning artifact configured with weights specific to the multimedia output to evaluate and quantify user-experience (UX) feedback.

In some embodiments, the machine learning artifact comprises a convolutional neural network, and wherein the inputted matrix is arranged as a two-dimensional greyscale image.

In some embodiments, the instructions, when executed by the processor, further cause the processor to: segment the recorded audio file or the cached into a plurality of segments; normalize the plurality of segments; determine intensity of the frequencies bands of the plurality of segments by performing a Fast Fourier Transform of the plurality of segments; and, generate a two-dimensional image having m*n pixels, wherein m is a number of segments of the plurality of segments and n is an intensity of a given frequency band.

In some embodiments, the instructions, when executed by the processor, further cause the processor to: encrypt output of the machine learning artifact; and, transmit, over a network, output of the machine learning artifact to an external UX analysis service, wherein the output of the machine learning artifact is used by the UX analysis service to trigger a reward to an account associated with the user.

In some embodiments, the instructions when executed by the processor, further cause the processor to: acquire, via one or more accelerometers of the computing device, one or more detected accelerometer signals immediately following the audio output as an accelerometer file or as cached data, wherein the one or more detected accelerometer signals comprise an additional part of the user-experience (UX) feedback of the user-interface presentation; and, determine a second matrix comprising the plurality of acquired accelerometer signal files or cached data and providing the second matrix to the machine learning artifact, wherein the second matrix is used as a second input for the machine learning artifact configured with weights specific to the multimedia output to evaluate and quantify user-experience (UX) feedback.

BRIEF DESCRIPTION OF THE DRAWINGS

Embodiments of the present invention may be better understood from the following detailed description when read in conjunction with the accompanying drawings. Such embodiments, which are for illustrative purposes only, depict novel and non-obvious aspects of the invention. The drawings include the following figures:

FIG. 4 shows a diagram of a ringtone database in accordance with an illustrative embodiment.

FIG. 5 shows a diagram of a user database in accordance with an illustrative embodiment.

FIG. 6 shows a diagram of a response database in accordance with an illustrative embodiment.

FIG. 7 shows an example graphical user interface of a ringtone selection screen in accordance with an illustrative embodiment.

FIG. 8 shows an example graphical user interface of a ringtone selection confirmation screen in accordance with an illustrative embodiment.

FIG. 9 shows an example notification that is transmitted to the user's computing device upon a positive assessment of a user-experience (UX) feedback being determined in accordance with an illustrative embodiment.

DETAILED DESCRIPTION

Each and every feature described herein, and each and every combination of two or more of such features, is included within the scope of the present invention provided that the features included in such a combination are not mutually inconsistent.

It is understood that throughout this specification the identifiers "first", "second", "third", "fourth", "fifth", "sixth", and such, are used solely to aid in distinguishing the various components and steps of the disclosed subject matter. The identifiers "first", "second", "third", "fourth", "fifth", "sixth", and such, are not intended to imply any particular order, sequence, amount, preference, or importance to the components or steps modified by these terms.

Figure 1:
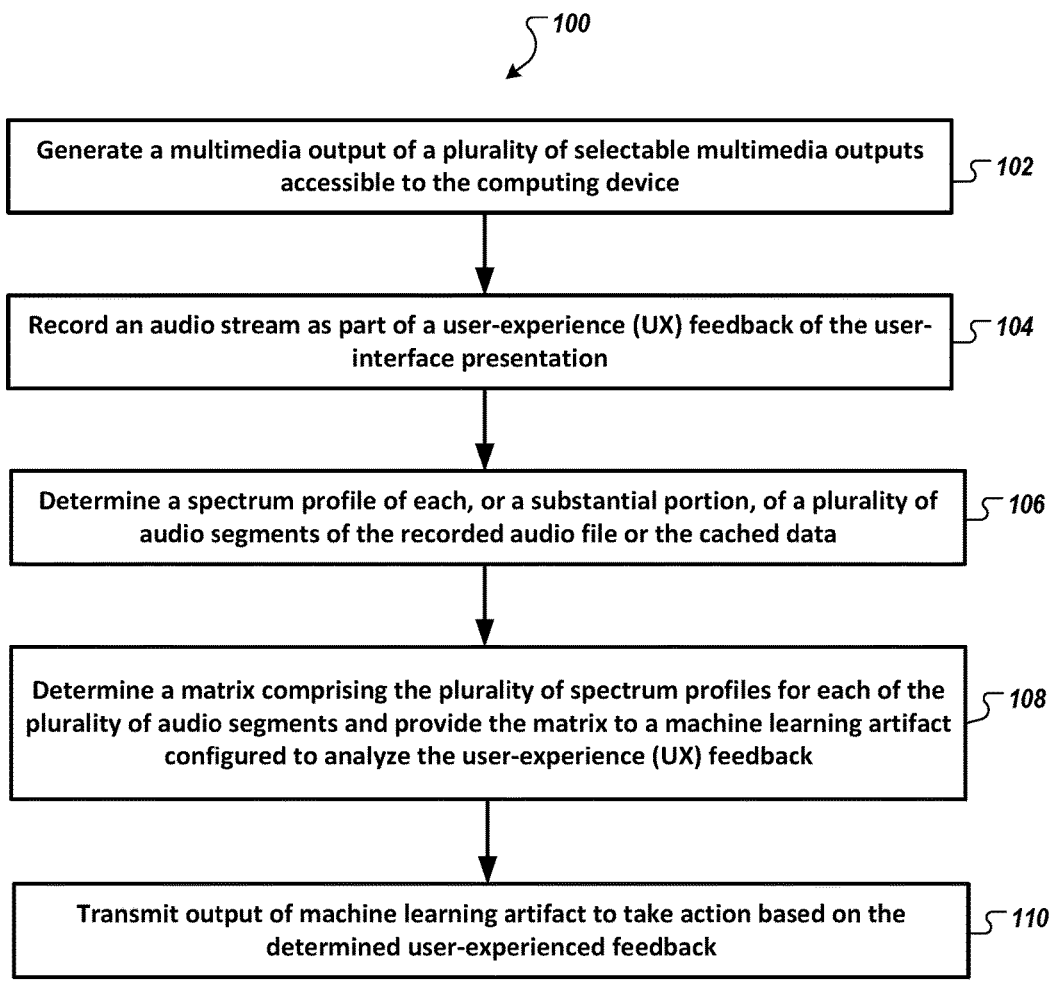
FIG. 1 is a flow diagram of a method to evaluate and quantify user-experience (UX) feedback in response to a user-interface presentation (e.g., a themed ringtone) in accordance with an illustrative embodiment.
Figure 2:
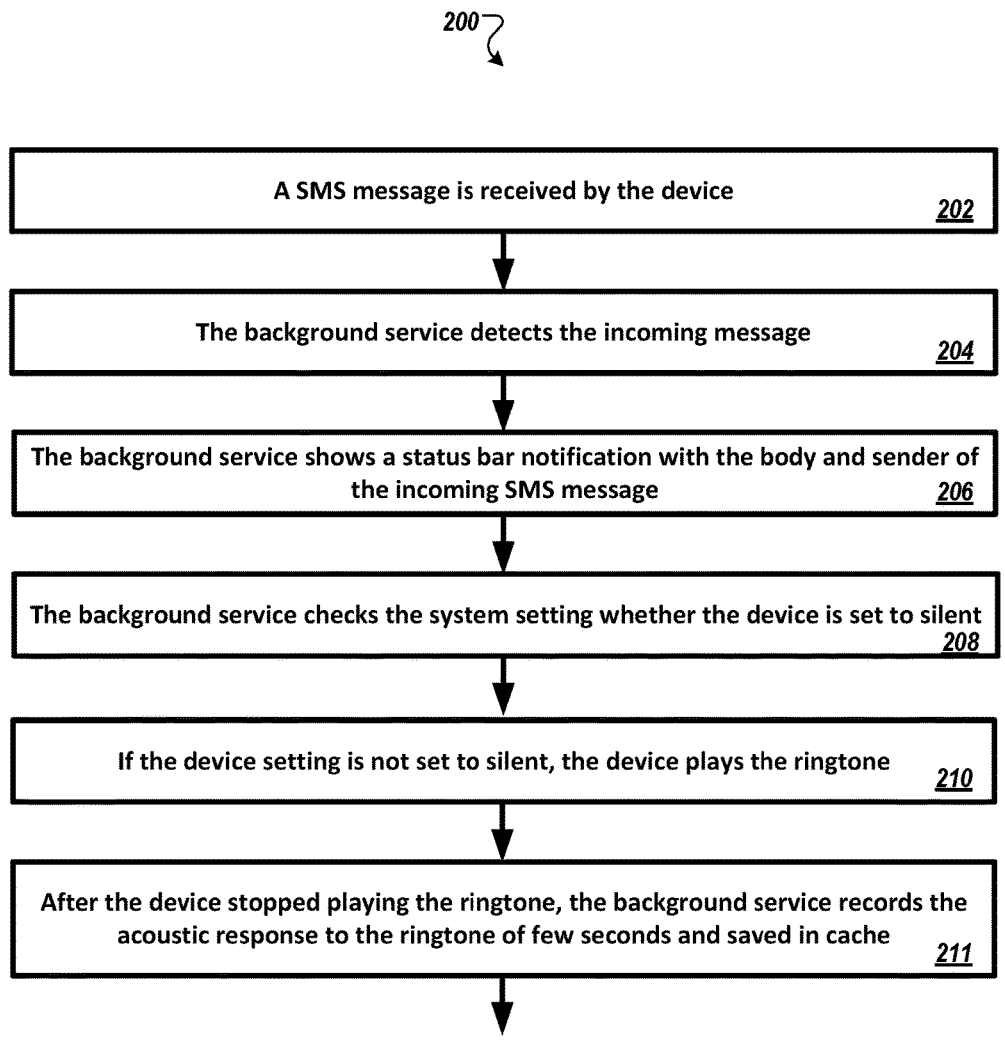
FIG. 2 shows a detailed flow diagram of the method of FIG. 1 to evaluate and quantify user-experience (UX) feedback in response to a user-interface presentation (e.g., a themed ringtone) in accordance with an illustrative embodiment.
Figure 2:
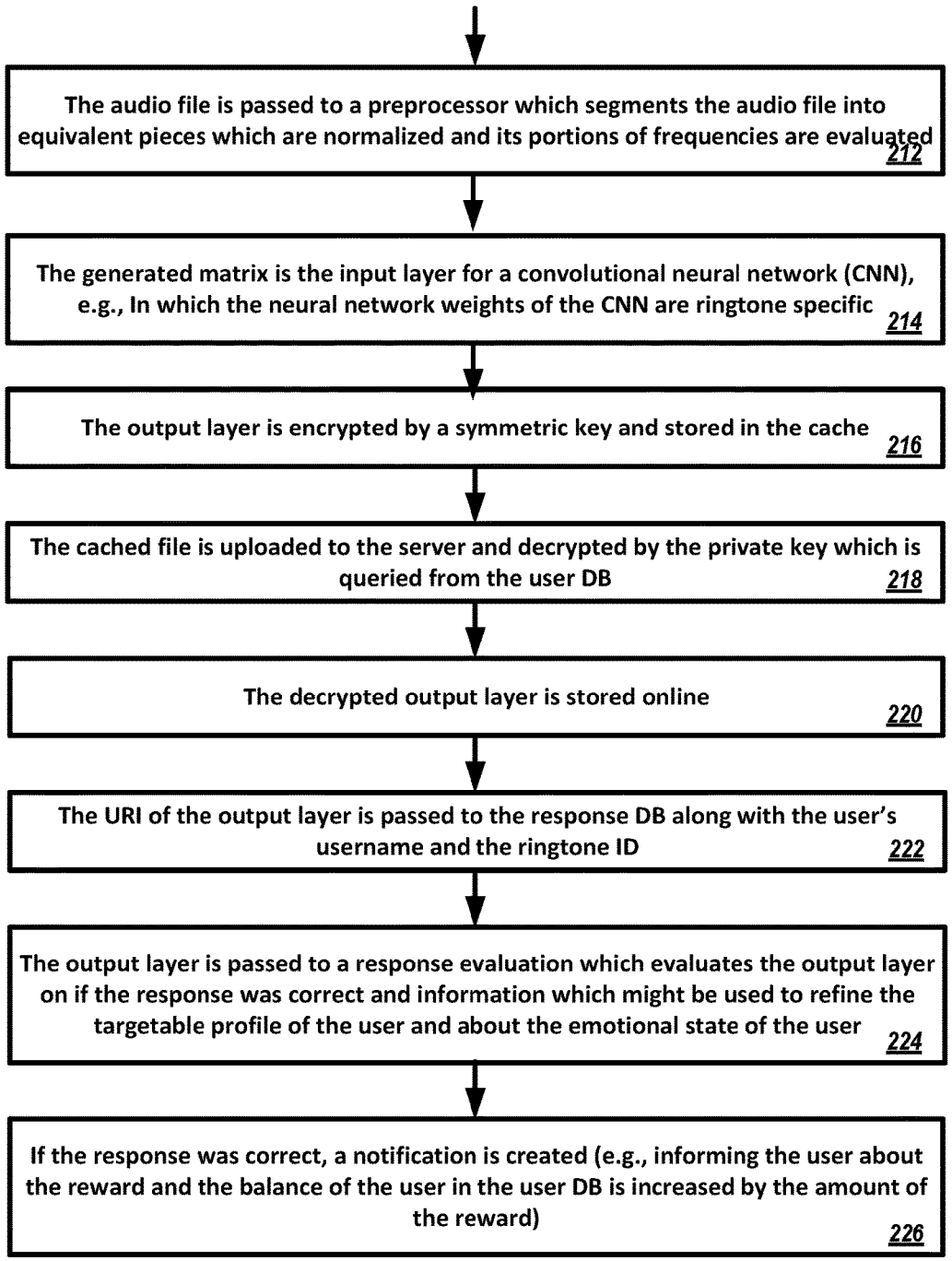

FIG. 1 is a flow diagram of a method 100 to evaluate and quantify user-experience (UX) feedback in response to a user-interface presentation (e.g., a themed ringtone) in accordance with an illustrative embodiment. FIG. 2 shows a detailed flow diagram of the method 100 of FIG. 1 to evaluate and quantify user-experience (UX) feedback in response to a user-interface presentation (e.g., a themed ringtone) in accordance with an illustrative embodiment.

In FIG. 1, the method 100 includes generating (step 102), by a processor of a computing device (e.g., smartphone, wearable devices, smartwatches, smart glasses, laptops, desktops), via one or more speakers of, or connected to, the computing device, a multimedia output of a plurality of selectable multimedia outputs accessible to the computing device in which the multimedia output includes an audio output (e.g., a ringtone) associated with a stored audio file and is generated upon receipt of an electronic communication or notification (e.g., a SMS message, electronic mail) at the computing device. As further shown in FIG. 2, in some embodiments, upon a message (e.g., SMS message) being received (step 202) at the computing device, a background service 300 operating on the computing device detects (step 204) the received SMS message and triggers a status bar notification (step 206) of the received SMS message. In some embodiments, the status bar notification includes an identifier of the sender and a portion of the message.

In parallel, before, or following the notification, the background service 304 is configured to check (step 208) the system setting and notification preference to determine whether the computing device is set to silent. When the system setting is not set to silent, the computing device is configured to generate (step 210), via one more speakers of the computing device, a multimedia output corresponding to a ringtone. When the system setting is set to silent, no further action is taken with respect to the evaluation of the user's UX response.

In some embodiments, in addition to audio output, the plurality of selectable multimedia outputs further includes a visualization element (e.g., ringtone includes associated ringtone graphics) or a haptics element. In some embodiments, the visualization element is rendered and presented on a display of the computing device contemporaneously with the audio output. In some embodiments, the haptics element is an associated vibration pattern associated with a motor that produces the vibration of the computing device contemporaneously with the audio output.

Referring back to FIG. 1, the method 100 then includes recording (step 104), by the processor, via one or more microphones of, or connected to, the computing device, an audio stream as part of a user-experience (UX) feedback of the user-interface presentation. The audio stream is recorded immediately following, and/or during, the audio output being generated. The audio stream is recorded as an audio file or as cached data. As used herein, the term "cache" is used interchangeably with the term "buffer". As further shown in FIG. 2, the background service (e.g., 310) is configured to enable (step 211) the recording module of the audio stream. In some embodiments, the background service (e.g., 310) directs the computing device to record a pre-defined length audio files, e.g., for at least about 0.3 seconds. In some embodiments, the recorded length is longer, e.g., for at least about 0.5 seconds, for at least about 1.0 seconds, for at least about 1.5 seconds, or for at least about 2.0 seconds. In some embodiments, the recorded length is greater than 2.0 seconds. In some embodiments, the recorded length is dynamically determined and is performed for the duration that an audio input is sensed up to a maximum duration (e.g., up to about 1 second or up to about 10 seconds). When the system setting is set to silent, the background service takes no action of recording or processing a response of the user.

As noted, the recording can initiate during the generation of the audio output. In some embodiments, the recording can initiate immediately after the recording, which can be with a millisecond or a fraction of a second (e.g., 0.1 seconds) following generation of the audio output.

In some embodiments, the recorded audio stream is saved to a memory cache of buffer of the computing device. In some embodiments, the recorded audio stream is saved to as an audio file.

The method 100 then includes determining (step 106), by the processor, a spectrum profile of each, or a substantial portion, of a plurality of audio segments of the recorded audio file or the cached data. A spectrum profile refers to a set of frequency-related components of an audio file or stream, such as ranges and distributions, that are decomposed from the audio file or stream during the pre-processing operation. The distribution can be tiered into bands. As further shown in FIG. 2, in some embodiments, the background service is configured to pass (step 212) the stored audio stream in cache/buffer, or the audio file, to a preprocessor module configured to segment the audio stream or file into equivalent pieces (e.g., 20 milli-second snippets). Other duration may be used to segment the audio stream or file.

The method 100 then includes determining (step 110) a matrix comprising the plurality of spectrum profiles for each of the plurality of audio segments and provide the matrix to a machine learning operation configured to analyze the user-experience (UX) feedback in which the matrix is used as an input to a machine learning operation configured with weights specific to the multimedia output to evaluate and quantify a user-experience (UX) feedback to the multimedia output. As further shown in FIG. 2 (step 214), in some embodiments, the segmented audio stream segments or file segments are normalized (e.g., by scaling each of the value to a maximum value in the audio stream segment of file segment) and a frequency profile of each segment is evaluated. In some embodiments, the frequency profile is generated based on a Fast Fourier Transform (FFT) operation that converts the time-series data set to a frequency data set to which main frequency components of the segment is determined. In some embodiments, the result (of step 214) is a two-dimensional matrix in which a first dimension includes a quantity of the audio segments and the second dimension includes a quantity of the frequency bands for that segment. In some embodiments, the two-dimensional matrix is generated as a two-dimensional greyscale image having m*n pixels. A FFT operation can include a short-term Fourier Transform or any decomposition or reconstruction operation that decompose the input signal into its frequency or energy components.

As a non-limiting example, in some embodiments, a convolutional neural network (operating on the computing device) takes as input a two-dimensional matrix formed as a greyscale image with m*n pixels in which each pixel has a single scalar value corresponding to its energy or intensity within a set of frequency bands. To generate the m*n pixels from the one-dimensional audio file or data so it can be analyzed by the convolutional neural network, the audio file or data is segmented into segments of a pre-defined length, e.g., 20 milliseconds. Each of audio snippets of 20-ms lengths is normalized, in some embodiments, for example, via a blend average operation (e.g., as noted above, by scaling each of the value to a maximum value in the audio stream segment of file segment) of the intensity of the frequencies bands. That is, each segments are evaluated to determine a frequency distribution which are tiered or placed in buckets. In some embodiments, the distribution is based on 20-Hz increments, and is generated via a Fast Fourier Transform. To this end, a 2D image is created with m*n pixels in which m is a number of 20-ms snippets that is created within the total length of the audio file or data, and n is a number of 20-Hz frequency bands (i.e., buckets). The pixel value of each of m*n pixel is then the intensity (e.g., energy) of the frequency component of a given snippet within a frequency band.

For example, for a 3-second input, the background service can partition the recorded audio file or data into 150 segments, each having a length of 20 milliseconds (i.e., m=60). A Fast Fourier Transform of each of the 20-ms segments is performed (by the background service) to convert the time-series data into the frequency domain in which each frequency is arranged in 20-Hz increments. For a frequency range of 4 KHz, n=200. Thus, a 150*200 matrix is generated from the 3-second input.

For other recorded durations, the image size can be expressed as: (# of seconds)*(50 segments per second)*(200 frequency ranges per segment) with these configurations. Of course, the image size can vary with a different degree of segmentation or FFT window size. As noted herein, the matrix can be configured with other sizes and shapes.

Other machine learning operations or algorithms may be used which are configured to receive as input a 1D vectors or tensors of higher dimension.

In some embodiments, the matrix is processed (step 214) in an input layer for a convolutional neural network (CNN) locally executing on the computing device in which the neural network weights of the convolutional neural network are ringtone specific. That is, the weights are established based on trained data set associated with a set of training user responses. In some embodiments, the training responses include voice recording having specific inflections in voice, emphasis of certain aspects of the utterance, certain verbal expression, etc., that are associated, for example, with excitement, happiness, etc. In some embodiments, the training responses include voice recording of individuals from various gender and age groups. The output of the convolutional neural network is a representation of the user-experience feedback that can be used to take subsequent action. The input for the convolutional neural network (as a machine learning operation), in some embodiments, is a two-dimensional matrix (e.g., a 2D greyscale image). In other embodiments, the input is a single dimensional matrix, a three-dimensional matrix, etc., or a combination thereof. The weights of the machine learning algorithm for a given audio output can be refined over time based on additional training data In some embodiments, the trained model is used to assess a positive user-experience of the user-interface presentation. In some embodiments, the output of the machine learning operation is used to refine the trained model to be used for the instant and other users.

Indeed, this representation of the audio file or data (i.e., output of the convolutional neural network) condenses the evaluation of the user experience feedback, making it more efficient and straightforward for subsequent analysis (e.g., in assessing whether the user's response was positive, whether the user response indicates that the user was excited or happy, etc.). Further, in addition to be more efficient in data size, the representation addresses issue of user privacy as only a representation of the response, and not the response itself (e.g., the recorded audio), is being provided over a network to an external processor (e.g., a UX analysis computing device).

Referring back to FIG. 1, the method 100 includes transmitting (step 110) the output of the machine learning operation to an external server over a network to which action based on the determined user-experienced feedback can be performed. As further shown in FIG. 2, in some embodiments, the background service encrypts (step 216) the output of the convolutional neural network by a symmetric key that is specific to the user and is known to the external processor. The encrypted data stream of file is then stored (step 216) in cache/buffer or in the device memory.

The background service then uploads (step 218) the cached/buffered file or data stream to a server associated with the external processor, which decrypts the uploaded file using a private key queried from a database (e.g., user DB) associated with the user. The decrypted representation is saved (step 220) on a server and is subsequently evaluated, e.g., to determine the user response (e.g., excited, happy, etc).

This encryption ensures that a unique instance of the user-experience feedback is sent and operated upon by the external processor. In some embodiments, the encryption key is updated periodically to reduce likelihood of manipulation of the system.

In some embodiments, the representation of user-experience feedback (e.g., output of the machine learning artifact) is used by the external processor (e.g., a UX analysis service) to trigger a reward to an account associated with the user. As shown in FIG. 2, in some embodiments, a URI (uniform resource identifier) identifying the encrypted output layer of the convolutional neural network is passed (step 222) to a server (e.g., associated with a response DB) along with the user's username and an identifier of the selected multimedia output (e.g., ringtone ID). The decrypted output layer of the convolutional neural network is passed (step 224) to a response evaluation operation which evaluates the output layer to determine if the response was correct (e.g., corresponding to, associated with, and/or correlated with the training data used) and information which might be used to refine the targetable profile of the user and about the emotional state of the user. If the response was correct, a notification is created (step 226) informing the user about the reward and a balance associated with the user in the database (e.g., user DB) is incremented by the amount of the reward.

In some embodiments, the method 100 further includes using other sensors of the computing device to evaluate and quantify user-experience (UX) feedback in response to a user-interface presentation. In some embodiments, the method 100 includes using the device's accelerometer. In some embodiments, during the recording of the audio stream, method 100 further includes acquiring, by the processor, via one or more accelerometers of, or connected to, the computing device, one or more detected accelerometer signals immediately following or during the audio output as an accelerometer file or as cached/buffered data, wherein the one or more detected accelerometer signals comprise an additional part of the user-experience (UX) feedback of the user-interface presentation. In some embodiments, a second matrix (e.g., two-dimensional image) is generated comprising the plurality of spectrum profiles of the plurality of accelerometer signal segments for each of the plurality of accelerometer signal segments. Indeed, the convolutional neural network is such embodiments is configured to receive more than one greyscale images or matrices.

In some embodiments, the accelerometer signal is a per-axis acceleration acquired from multiple single-channel accelerometers or one more multi-axis accelerometers over time. Each accelerometer signal, in some embodiments, is not decomposed into frequency bands and is directly fed into the machine learning operation as a "k*1" vector (in which k is the number of time segments). In some embodiments, for a 6-axis accelerometer (e.g., having 3 longitudinal and 3 rotational axis), the accelerometer inputs are clustered as a "k*6" matrix.

In some embodiments, the accelerometer signals are combined (e.g., appended) to the input matrix of the audio input to which corresponding time segments are aligned (e.g., to form a combined matrix of dimension k*(n+6)).

In some embodiments, the accelerometer data is decomposed to determine intensities or energy of the signal for specific bands of frequencies.

Exemplary System

Figure 3:
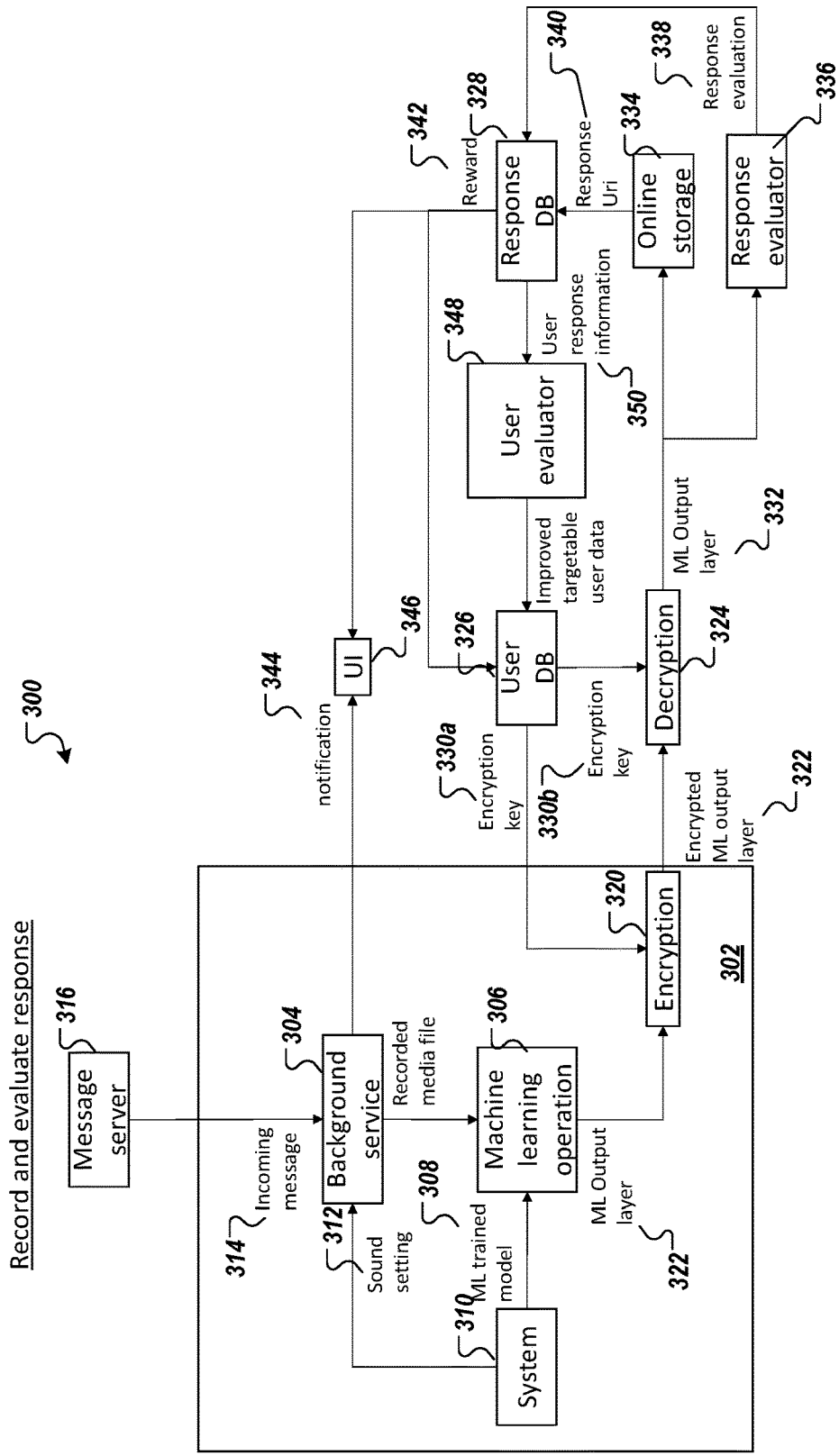
FIG. 3 shows a diagram of a system to evaluate and quantify user-experience (UX) feedback in response to a user-interface presentation in accordance with an illustrative embodiment.

FIG. 3 shows a diagram of a system 300 to evaluate and quantify user-experience (UX) feedback in response to a user-interface presentation in accordance with an illustrative embodiment. In FIG. 3, the computing device 302 is shown executing a background service 304. In some embodiments, the background service 304 is an executable file (e.g., an APP). Background services can include executable instructions, libraries, parse-able code, and any invoke-able services on a computing device. The background service 304 operatively communicate with the machine learning operation (shown as machine learning network 306). The machine learning operation 306 receives a machine-learning-based trained model 308 through the system services 310 (e.g., network interface) when the selectable multimedia outputs are installed to the system. The system services 310 further provide system configuration and settings 312 to the background service 304. The background service 304 is configured to react to an incoming message 314 received from an external message server or network 316.

As further shown in FIG. 3, the output 318 of the machine learning operation 306 is operatively coupled to an encryption module 320. The encryption module 320 generates an encrypted output 322 of the machine learning operation 306 which is transmitted over a network to corresponding decryption module 324 located at the UX analysis computing device. The UX analysis computing device may include more than one server. In some embodiments, the UX analysis computing device includes a storage area network that maintains a user database (shown as "User DB" 326) and a response database (shown as "Response DB" 328). The user database 326 maintains, among other things, encryption keys (shown as 330a and 330b) for each of the users that is accessible to the UX analysis computing device and to the user's computing device 302. An instance of the user database 326 specific to the user is stored on the device 302 and is synchronized with that of the server. Indeed, the device 302 has access only to the information of user associated with the computing device including user name, profile information, authentication such as the user's email address, and the user's reward balance. The encryption key is not accessible by the user or other applications on the device.

Referring still to FIG. 3, the output 332 of the decryption module 324, as the decrypted output layer of the machine-learned operation, is provided to storage 334 and to a response evaluator module 336. The response evaluator module 336 is configured to evaluate the output layer 332 of the machine-learned operation to classify the outputs either as a positive response or a negative response to which a reward should be provided. The output of the response evaluator 336 is provided as a response evaluation 338 to the response database 328.

The response database 328 stores information relating to the user experience feedback of a user to a given stimuli (e.g., user's verbal and/or physical response to the ringtone). In some embodiments, the information includes the ML output layer data 332, the time and location of the response, the URI of the representation 340 of the audio file from the recorded response, and information 338 gathered on the response such as whether the response was positive, whether a reward was granted for the response, and/or the reward amount or type granted for the response.

When a new entry is entered in the response database, the balance of the corresponding user is increased (shown as "reward" 342) and a notification (344) is sent through a user interface module 346. Examples of the notifications includes a cheering message, a coupon, a monetary or credit, or access to a special multimedia content. The reward might be send to the user for each reaction, and bundled for various reactions based on a logic.

The UX analysis computing device further includes a user evaluator module 348. The user evaluator module 348 retrieves the user response information 350 from the response database 328. The targetable profile is updated based on information gathered by responses and selection of ringtones.

FIG. 4 shows a diagram of a ringtone database 402 in accordance with an illustrative embodiment. The ringtone database 402 may include information about the users and the ringtone that may be targeted to a given user. As shown in FIG. 4, the ringtone database 402 may include an identifier field 404, a ringtone title field 406, a ringtone description field 408, a ringtone category field 410, an audio URI field 412, an image URI field 414, a model URI field 416, a reward profile field 418, a target group field 420, and a target location field 422.

As noted above, a partial instance of the ringtone DB can be downloaded to the computing device 302 when a ringtone selection is opened. Information directed to title 406, description 408, reward amount 418, and category 410 may be displayed at the user's computing device, e.g., in a ringtone selection screen 702 (not shown, see FIG. 7). A corresponding image of each ringtone can be downloaded from the URI specified in the image URI field 414. When a new ringtone is selected at the user's computing device 302 in the ringtone selection activity screen, a ringtone audio file can be downloaded from the URI specified in the Audio URI field 412, and the trained neural network with the ringtone specific weights can be downloaded from the URI specified in the model URI field 416.

FIG. 5 shows a diagram of a user database 326 in accordance with an illustrative embodiment. An instance of the user database 326 can be stored on the user's computing device 302 and synchronized with the UX analysis computing device. As shown in FIG. 5, the user database 326 may include a username field 424, a provider authentication field 426, a location field 428, a demographic field 430, a targetable profile field 432, a balance field 434, an encrypted key field 436, and a selected ringtone field 437.

The user's computing device 302, in some embodiments, has access only to information associated with the user including the user's username, user's profile information, user's authentication information such as an email address associated with the user's account, and a user's balance. The encryption key 330a is configured by the system not to be accessible by the user. The encryption key 330a can be updated periodically to improve fraud protection. The encryption key 330a can be updated in the APP by a remote maintenance service or module. The encryption key 330a may be stored in a secure memory space.

Referring still to FIG. 5, the information stored in the targetable profile field 432 may be used to determine which ringtones are accessible to the user. The targetable profile field 432 may be updated based on information gathered by responses (e.g., 350) and selection of ringtones.

FIG. 6 shows a diagram of a response database 328 in accordance with an illustrative embodiment.

The response database 328 is not accessible by the user's computing device 302. It stores information on responses to ringtones such as the user responding to the ringtone, time and location of the response, the URI of the representation of the audio file from the recorded response, information gathered on response such as whether a response was positive and whether a reward was granted for the response. When a new entry is entered in the response database, the balance of the corresponding user is increased. As shown in FIG. 6, the response database 328 may include a username field 438, a date and time field 440, a location field 442, a response URI field 444, a ringtone identifier field 446, a mood field 448, an energy field 450, a company field 452, and a reward field 454.

FIG. 7 shows an example graphical user interface of a ringtone selection screen 702 in accordance with an illustrative embodiment. As shown in FIG. 7, the ringtone selection screen 702 includes three selectable ringtones 704a, 704b, 704c that are presented to the user on the user's computing device 302. Each of the selectable ringtones include an image 706 associated with the ringtone, a title 708 for the ringtone, a description of the ringtone 710, and a reward amount 712. The reward amount 712 is the amount of reward that would be credited to a user's account upon a positive reaction being assessed based on a ringtone being presented and/or played to the user in response to a SMS message.

FIG. 8 shows an example graphical user interface of a ringtone selection confirmation screen 802 in accordance with an illustrative embodiment. The screen 802 includes an input widget 804 to play a sample of the ringtone, an input widget 806 to accept the ringtone, and an input widget 808 (shown as "cancel") to return to the selection screen 702.

FIG. 9 shows an example notification 344 that is transmitted to the user's computing device 302 upon a positive assessment of a user-experience feedback being determined in accordance with an illustrative embodiment.

Figure 10:
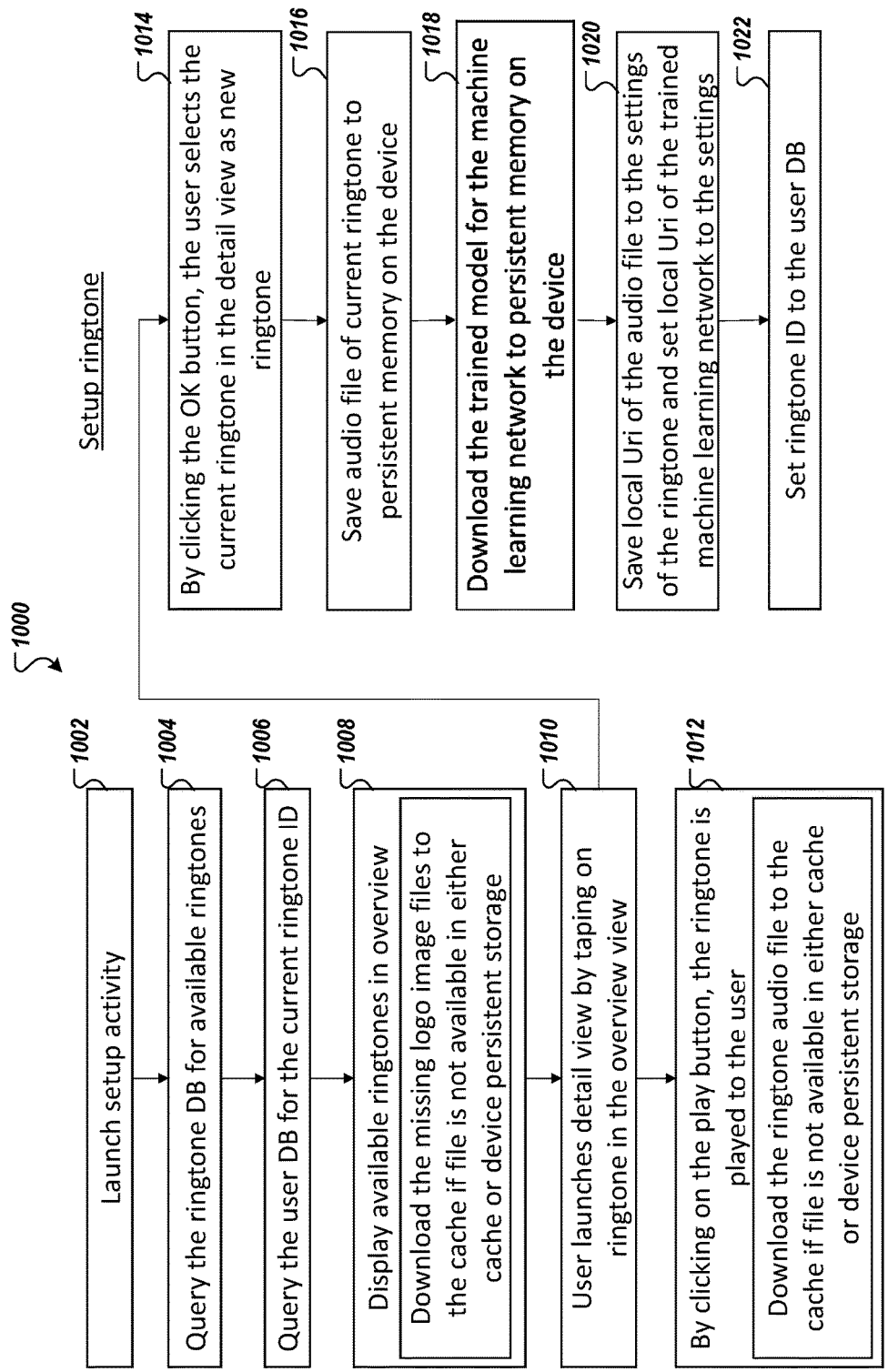
FIG. 10 is a flow diagram of a method to setup a ringtone in accordance with an illustrative embodiment.
Figure 11:
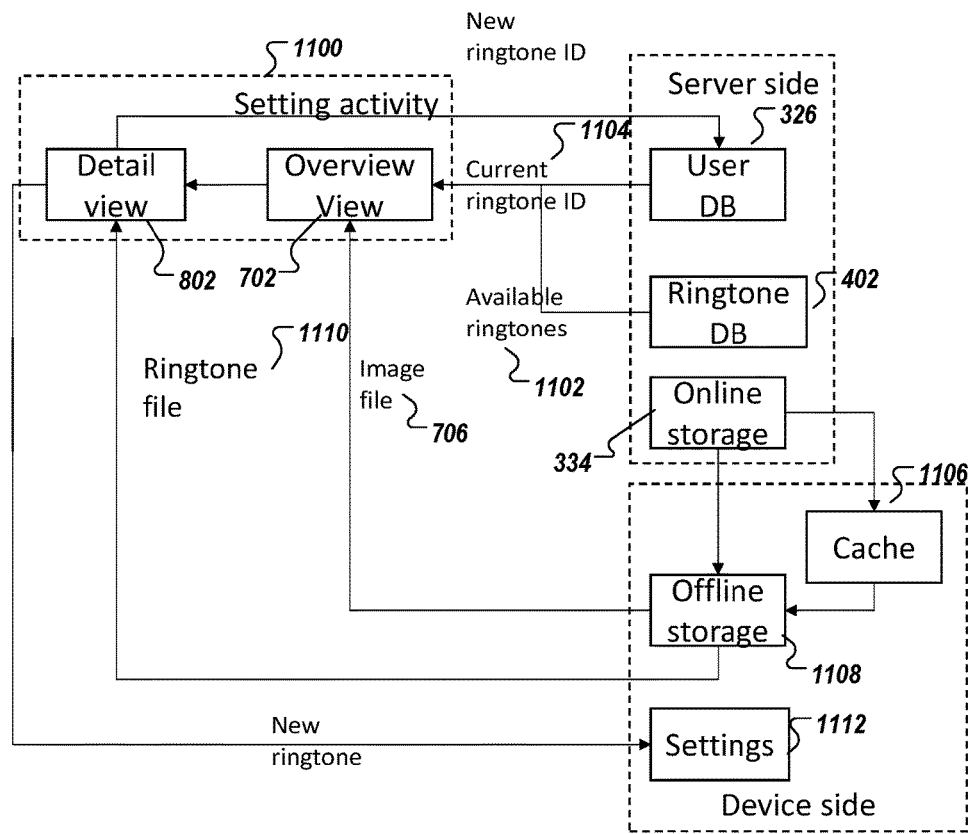
FIG. 11 is a system diagram of selecting a user-interface presentation (e.g., a ringtone) according to the method of FIG. 10 in accordance with an illustrative embodiment.

FIG. 10 is a flow diagram of a method 1000 to setup a ringtone in accordance with an illustrative embodiment. FIG. 11 is a system diagram of selecting a user-interface presentation (e.g., a ringtone) according to the method of FIG. 10 in accordance with an illustrative embodiment.

The method 1000 includes, upon launching (step 1002) the setup activity 1100 of an APP on the user's computing device 302, querying (step 1004) the ringtone database 402 for available ringtones 1102. The servers of the UX analysis computing devices provides available ringtones 1102 to the ringtone selection screen 702 presented at the user's computing device 302. The APP is configured to query (step 1006) the user database 326 for the current ringtone ID 1104 and display (step 1008) available ringtones in ringtone selection screen 702. The APP further downloads any missing logo image files 706 to the cache 1106 (and/or buffer) if file is not available in either cache 1106 or device persistent storage 1108. Upon the user selecting a ringtone selection in the ringtone selection screen 702, the APP presents (step 1010) the user with a ringtone selection confirmation screen 802. By clicking (step 1012) on the play button 804, a ringtone is played to the user. The APP is configured to download the ringtone audio file to the cache/buffer if the file is not available in either cache/buffer or device persistent storage. By clicking the OK button 806, the user selects (step 1014) the current ringtone in the detail view as the new ringtone. The APP then saves (step 1016) the audio file of the current ringtone to persistent memory on the computing device 302. The APP then downloads (step 1018) the machine-learning-based trained model 308 for the machine learning operation 306 to persistent memory 1108 on the device 302. The APP then saves (step 1020) a local URI of the audio file 1110 to the settings 1112 of the ringtone and set the local URI of the machine-learning-based trained model 308 to the settings 1112. The APP then set (step 1022) the ringtone identifier at the user database 326.

Indeed, the exemplified methods and system facilitates the capture, evaluation, and reward of a user's reaction to a theme which is played on the user's computing device. Besides ringtone, other interactions and reactions to other types of themes can be assessed using the exemplary methods and systems described herein. The exemplified systems and methods can be applied to any interaction from the client devices to the client to make the client aware of an intended target notification or information and to provoke a client reaction to a theme. The exemplified systems and methods can be used to further evaluate a user's reaction or response to receipt of a reward. In some embodiments, in addition or in substitution of a reward, the APP can be configured to play another theme or multimedia output upon sensing a positive assessment of the user experience feedback.

The trigger to play a theme might be an incoming message, call, notification from an application having access to at least one of the client devices or being installed on at least one client device, a reward for the reaction on a theme, or a trigger from the client which can be sensed by at least one of the client devices.

The theme might be any combination of visual, acoustic and haptic signals.

Examples for visual signals are blinking flash light, text on the screen, a video, the picture captured by the device camera, streaming content, and reality augmented content. Examples for acoustic signals are songs, rhythms, melodies, and slogans. Examples for haptic signals are rotation, vibration and texture sensible on the surface of a client device. The theme might be played on various client devices at the same time. An example for a theme being played on more than one client device is when the cell phone plays a melody while the smart watch vibrates and blinks.

Visual, acoustic, tactile and motion signals might be captured to record the client reaction to a theme. Examples for sensors to detect visual signals of the reaction are illumination sensors and cameras. Examples for sensors detecting devices include cellphones, wearables, IoT devices and computers. Examples for cellphones are smartphones and flip phones. Examples for wearables are smart watches, fitness trackers, headsets, smart glasses and virtual reality devices. Examples for IoT devices are smart TVs, refrigerators, thermostats, and other devices which are connected to a network and which are able to emit and/or receive information. Examples for computers are tablets, laptops, personal computers and game consoles.

There are various possible reactions to a theme. Examples for how to react to a theme are to respond, complete, accompany, mimic, make faces, and pose.

Various criteria might be taken into account to evaluate the reaction. Examples for reactions are if and which reaction was captured, client emotion in the response, the environment where the reaction was captured and the company of the client during the caption of the reaction. The client expresses his emotion in the reaction to the theme verbally and non-verbally.

Examples for how the emotion is expressed non-verbally in the reaction are the facial expression, gestures, biosignals and identification. Examples for biosignals are to turn red, sweat, give goose skin, and tears rolling. An examples for identification is to place an object between the upper lip and nose to play having a mustache.

Examples for information on the environment where the reaction was captured are illumination, background acoustics, temperature, and location. Examples for how the explicit location could be determined are if the client device shares the location with the application, and if the client device is detected by a local network of which the location is known. Examples for local networks are Wi-Fi, Bluetooth, near-field, and cellular.

As used herein, processor refers to a physical hardware device that executes encoded instructions for performing functions on inputs and creating outputs. Exemplary processors for use in this disclosure are described herein in relation to FIGS. 1-5. In some embodiments, the processor may comprise a plurality of processors that are in communication with one another. Processors can include microprocessors, graphic-based processing units (GPUs), ASICs, microcontrollers, and quantum processors that can execute instructions.

As used herein, "computer" may include a plurality of computers. The computers may include one or more hardware components such as, for example, a processor, a random access memory (RAM) module, a read-only memory (ROM) module, a storage, a database, one or more input/output (I/O) devices, and an interface. Alternatively and/or additionally, computer may include one or more software components such as, for example, a computer-readable medium including computer executable instructions for performing a method associated with the exemplary embodiments. It is contemplated that one or more of the hardware components listed above may be implemented using software. For example, storage may include a software partition associated with one or more other hardware components. It is understood that the components listed above are exemplary only and not intended to be limiting.

Processor may include one or more processors, each configured to execute instructions and process data to perform one or more functions associated with a computer for indexing images. Processor may be communicatively coupled to RAM, ROM, storage, database, I/O devices, and interface. Processor may be configured to execute sequences of computer program instructions to perform various processes. The computer program instructions may be loaded into RAM for execution by processor.

RAM and ROM may each include one or more devices for storing information associated with operation of processor. For example, ROM may include a memory device configured to access and store information associated with the computer including information for identifying, initializing, and monitoring the operation of one or more components and subsystems. RAM may include a memory device for storing data associated with one or more operations of processor. For example, ROM may load instructions into RAM for execution by processor.

Storage may include any type of mass storage device, including network-based storage, configured to store information that processor may need to perform processes consistent with the disclosed embodiments. For example, storage may include one or more magnetic and/or optical disk devices, such as hard drives, CD-ROMs, DVD-ROMs, or any other type of mass media device.

Database may include one or more software and/or hardware components that cooperate to store, organize, sort, filter, and/or arrange data used by the computer and/or processor. For example, database may store the source CAD model and parameters to generate the three-dimensional meta-structure models therefrom. It is contemplated that database may store additional and/or different information than that listed above.

I/O devices may include one or more components configured to communicate information with a user associated with computer. For example, I/O devices may include a console with an integrated keyboard and mouse to allow a user to maintain a database of images, update associations, and access digital content. I/O devices may also include a display including a graphical user interface (GUI) for outputting information on a monitor. I/O devices may also include peripheral devices such as, for example, a printer for printing information associated with controller, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface may include one or more components configured to transmit and receive data via a communication network, such as the Internet, a local area network, a workstation peer-to-peer network, a direct link network, a wireless network, or any other suitable communication platform. For example, interface may include one or more modulators, demodulators, multiplexers, demultiplexers, network communication devices, wireless devices, antennas, modems, and any other type of device configured to enable data communication via a communication network.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

While the methods and systems have been described in connection with certain embodiments and specific examples, it is not intended that the scope be limited to the particular embodiments set forth, as the embodiments herein are intended in all respects to be illustrative rather than restrictive.

What is claimed is:

1. A computer-implemented method to evaluate and quantify user-experience (UX) feedback in response to a user-interface presentation (e.g., a themed ringtone), the method comprising:
    generating, by a processor of a computing device, via one or more speakers of, or connected to, the computing device, a multimedia output of a plurality of selectable multimedia outputs accessible from the computing device, wherein the multimedia output comprises an audio output associated with a stored audio file, and wherein the multimedia output is generated upon receipt of an electronic communication or notification at the computing device;
    recording, by the processor, via one or more microphones of, or connected to, the computing device, an audio stream as part of a user-experience (UX) feedback to the user-interface presentation, wherein the audio stream is recorded immediately following, and/or during, the audio output being generated, and wherein the audio stream is recorded as an audio file or as a cached data;
    determining, by the processor, a spectrum profile of each, or a substantial portion, of a plurality of audio segments of the recorded audio file or the cached data; and
    determining, by the processor, a matrix comprising the plurality of spectrum profiles for each of the plurality of audio segments and providing the matrix to a machine learning operation configured to analyze the user-experience (UX) feedback, wherein the matrix is used as an input for the machine learning operation configured with weights specific to the multimedia output to evaluate and quantify user-experience (UX) feedback of the multimedia output.

2. The method of claim 1, wherein the machine learning operation comprises a convolutional neural network, and wherein the inputted matrix is arranged as a two-dimensional matrix.

3. The method of claim 2, wherein the inputted matrix is determined by:
    segmenting, by the processor, the recorded audio file or the cached into a plurality of segments;
    normalizing, by the processor, the plurality of segments;
    determining, by the processor, intensity of frequencies bands of the plurality of segments by dividing into frequency components of the plurality of segments; and
    generating, by the processor, the two-dimensional matrix, wherein the two-dimensional matrix is of dimension m*n, wherein m is a number of segments of the plurality of segments and n is a number of frequency bands of a plurality of frequency bands to which the segment is evaluated, and wherein each matrix element has at least a scalar value corresponding to an intensity of a given frequency band for a given segment.

4. The method of claim 1, further comprising:
    acquiring, by the processor, via one or more accelerometers of the computing device, one or more detected accelerometer signals immediately following the audio output as an accelerometer file or as cached data, wherein the one or more detected accelerometer signals comprise an additional part of the user-experience (UX) feedback of the user-interface presentation; and
    determining by the processor, a second matrix comprising the plurality of accelerometer signals and providing the second matrix as an input to the machine learning operation.

5. The method of claim 1, wherein the plurality of selectable multimedia outputs further comprises a visualization element (e.g., ringtone includes associated ringtone graphics), wherein the visualization element is rendered and presented on a display of the computing device contemporaneously with the audio output.

6. The method of claim 5, wherein the plurality of selectable multimedia outputs further comprises a haptics element (e.g., ringtone includes associated vibration pattern), wherein the haptics element triggers rotation of a motor of the computing device to produce vibration of the computing device contemporaneously with the audio output.

7. The method of claim 1, wherein the computing device is selected from the group consisting of smartphone, wearable devices, smartwatches, smart glasses, laptops, and desktops.

8. The method of claim 1, further comprising:
wherein the output of the machine learning operation is used to assess a positive user-experience and/or a negative user-experience of the user-interface presentation.

9. The method of claim 1, further comprising:
transmitting, by the processor, over a network, output of the machine learning operation to an external UX-analysis service, wherein the output of the machine learning operation is used by the UX-analysis service to trigger a reward to an account associated with the user.

10. The method of claim 9, further comprising:
encrypting, by the processor, output of the machine learning operation prior to transmission of the output to the external UX-analysis service.

11. A system comprising:
a processor; and
a memory having instructions stored thereon, wherein execution of the instructions by the processor, cause the processor to:
generate, via one or more speakers of, or connected to, the system, a multimedia output of a plurality of selectable multimedia outputs accessible to the system, wherein the multimedia output comprises an audio output (e.g., a ringtone) associated with a stored audio file, and wherein the multimedia output is generated upon receipt of an electronic communication or notification (e.g., a SMS message, electronic mail) at the system;
record, via one or more microphones of, or connected to, the system, an audio stream as part of a user-experience (UX) feedback of a user-interface presentation, wherein the audio stream is recorded immediately following, and/or during, the audio output being generated, and wherein the audio stream is recorded as an audio file or as a cached data;
determine, a spectrum profile of each, or a substantial portion, of a plurality of audio segments of the recorded audio file or the cached data; and
determine a matrix comprising the plurality of spectrum profiles for each of the plurality of audio segments and provide the matrix to a machine learning artifact configured to analyze the user-experience (UX) feedback, wherein the matrix is used as an input to the machine learning artifact configured with weights specific to the multimedia output to evaluate and quantify a user-experience (UX) feedback of the multimedia output.

12. The system of claim 11, wherein the machine learning artifact comprises a convolutional neural network, and wherein the inputted matrix is arranged as a two-dimensional matrix.

13. The system of claim 12, wherein the instructions, when executed by the processor, further cause the processor to:
segment the recorded audio file or the cached into a plurality of segments;
normalize the plurality of segments; and
determine intensity of the frequencies bands of the plurality of segments by dividing into frequency components of the plurality of segments; and
generate the two-dimensional matrix, wherein the two-dimensional matrix is of dimension m*n, wherein m is a number of segments of the plurality of segments and n is a number of frequency bands of the plurality of frequency bands, and each matrix element has at least a scalar value corresponding to an intensity of a given frequency band for a given segment.

14. The system of claim 11, wherein the instructions, when executed by the processor, further cause the processor to:
encrypt output of the machine learning artifact; and
transmit, over a network, output of the machine learning artifact to an external UX-analysis service, wherein the output of the machine learning artifact is used by the external UX-analysis service to trigger a reward to an account associated with the user.

15. The system of claim 11, wherein the instructions when executed by the processor, further cause the processor to:
acquire, via one or more accelerometers of the system, one or more detected accelerometer signals immediately following or during the audio output as an accelerometer file or as cached data, wherein the one or more detected accelerometer signals comprise an additional part of the user-experience (UX) feedback of the user-interface presentation; and
determine a second matrix comprising the plurality of accelerometer signals and provide the second matrix to the UX-analysis computing device, wherein the second matrix is used as a second input to the machine learning artifacts.

16. A non-transitory computer readable medium having instructions stored thereon, wherein execution of the instructions by a processor of a computing device causes the processor to:
generate, via one or more speakers of, or connected to, the computing device, a multimedia output of a plurality of selectable multimedia outputs accessible to the computing device, wherein the multimedia output comprises an audio output (e.g., a ringtone) associated with a stored audio file, and wherein the multimedia output is generated upon receipt of an electronic communication or notification (e.g., a SMS message, electronic mail) at the computing device;
record, via one or more microphones of, or connected to, the computing device, an audio stream immediately following, and/or during, the audio output as part of a user-experience (UX) feedback of the user-interface presentation, wherein the audio stream is recorded as an audio file or as a cached data;
determine, a spectrum profile of each, or a substantial portion, of a plurality of audio segments of the recorded audio file or the cached data; and
determine a matrix comprising the plurality of spectrum profiles for each of the plurality of audio segments and provide the matrix to a machine learning artifact configured to analyze the user-experience (UX) feedback, wherein the matrix is used as an input to a machine learning artifact configured with weights specific to the multimedia output to evaluate and quantify a user-experience (UX) feedback to the multimedia output.

17. The computer readable medium of claim 16, wherein the machine learning artifact comprises a convolutional neural network, and wherein the inputted matrix is arranged as a two-dimensional matrix.

18. The computer readable medium of claim 16, wherein the instructions, when executed by the processor, further cause the processor to:
segment the recorded audio file or the cached data into a plurality of segments;
normalize the plurality of segments; and
determine intensity of the frequencies bands of the plurality of segments by dividing into frequency components of the plurality of segments; and generate the two-dimensional matrix, wherein the two-dimensional matrix is of dimension m*n, wherein m is a number of segments of the plurality of segments and n is a number of frequency bands of the plurality of frequency bands, and each matrix element has at least a scalar value corresponding to an intensity of a given frequency band for a given segment.

19. The computer readable medium of claim 16, wherein the instructions, when executed by the processor, further cause the processor to:
  encrypt output of the machine learning artifact; and
  transmit, over a network, output of the machine learning artifact to an external UX analysis service, wherein the output of the machine learning artifact is used by the external UX analysis service to trigger a reward to an account associated with the user.

20. The computer-readable medium of claim 16, wherein the instructions when executed by the processor, further cause the processor to:
  acquire, via one or more accelerometers of the computing device, one or more detected accelerometer signals immediately following and/or during the audio output as an accelerometer file or as cached data, wherein the one or more detected accelerometer signals comprise an additional part of the user-experience (UX) feedback of the user-interface presentation; and
  determine a second matrix comprising the plurality of acquired accelerometer signals and providing the second matrix to the machine learning artifact, wherein the second matrix is used as a second input to the machine learning artifact configured with weights specific to the multimedia output to evaluate and quantify a user-experience (UX) feedback to the multimedia output.

* * * * *